(No Model.)
R. S. JENNINGS.
METHOD OF AND APPARATUS FOR COLLECTING THE AROMATIC AND VOLATILE SUBSTANCES FROM COFFEE.
No. 246,274. Patented Aug. 23, 1881.
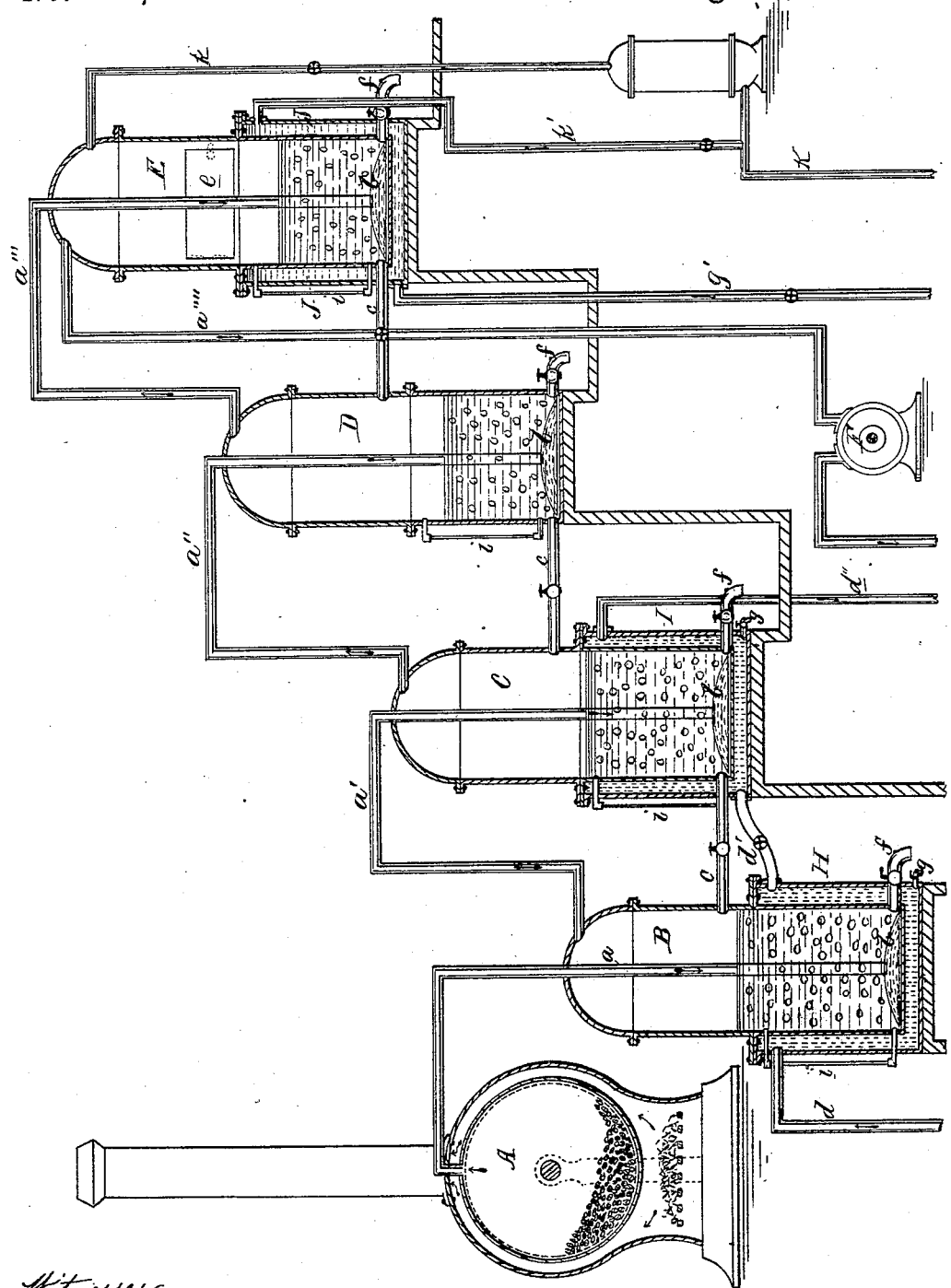
Witnesses:
Chas. E. Lewis.
T. T. Kane.
Inventor
Ralph S. Jennings
By E. W. Johnson
Atty.

UNITED STATES PATENT OFFICE.

RALPH S. JENNINGS, OF BALTIMORE, MARYLAND.

METHOD OF AND APPARATUS FOR COLLECTING THE AROMATIC AND VOLATILE SUBSTANCES FROM COFFEE.

SPECIFICATION forming part of Letters Patent No. 246,274, dated August 23, 1881.

Application filed June 15, 1881. (No model.)

*To all whom it may concern:*

Be it known that I, RALPH S. JENNINGS, a citizen of the United States, residing at Baltimore, in the county of Baltimore and State of Maryland, have invented certain new and useful Improvements in Methods of and Apparatus for Collecting the Aromatic and Volatile Substances from Coffee; and I do hereby declare the following to be a full, clear, and exact description of the invention, such as will enable others skilled in the art to which it appertains to make and use the same, reference being had to the accompanying drawing, and to letters or figures of reference marked thereon, which forms a part of this specification.

This invention relates to certain new and useful improvements in the art, method, and apparatus for utilizing the volatile products which are given off from the coffee-bean while being roasted, and in obtaining therefrom the product known as "caffeine," which is valuable, and which has heretofore been lost, or, when the products have been collected, has been rendered useless until freed from obnoxious products which are also given off from the coffee.

The object of my invention is to save and utilize the vapors which escape during the roasting of the coffee by saturating a liquid with the products carried over, and at the same time freeing said liquid from other volatile products which are given off from the coffee, and which would render the liquid worthless until refined or freed from such obnoxious products; and to this end my invention consists in the method of collecting the aroma or volatile matters of the coffee-bean while being roasted by passing them through hot water for the purpose of impregnating the hot water with the products which are given off from the coffee, which products consist principally of caffeine.

My invention also consists in a novel art or method of collecting the volatile products which are given off while the coffee is being roasted, which method consists in passing the aromatic and volatile substances through hot water for the purpose of impregnating the hot water with caffeine, and through cold water for the purpose of collecting the empyreumatic oils, &c., which are among the products which are given off from the coffee.

My invention also consists in saving and utilizing the vapors which escape from coffee while being roasted, which consists in causing the products which are given off from the coffee to pass through hot water in order to retain the caffeine, next through warm water to temper the products which, from their nature, are not retained in hot water, and lastly through cold water for the purpose of collecting the empyreumatic oils, &c.

My invention also consists in providing a coffee-roaster with pipes and a means of forcing the aroma or volatile matters through several vessels, the first vessel of the series containing hot water.

My invention also consists in the construction, arrangement, and combination of the parts, as will be hereinafter described and claimed.

In the annexed drawing I have shown one form of apparatus which I use in carrying out my invention; but I do not wish to confine myself to the arrangement and construction shown thereon, as the apparatus may be varied without departing from the spirit of my invention.

In the annexed drawing, A represents a coffee-roaster, which is provided with a tight casing, in which the screen containing the beans revolves. This casing is provided with a pipe, through which the products which are released from the coffee while being roasted pass to the vessels to be treated. This pipe, $a$, which terminates near the bottom of the vessel B, is provided with a foraminous diaphragm, $b$, through which the products from the roasted coffee pass into and through the liquid and to the upper part of the vessel. The vessel B is connected by the pipes $a'$ $c$ to a vessel, C, which is similar in construction. The vessels B C are intended to contain hot water, and are provided with jackets H I, which jackets are supplied with steam or hot water or other heating means, through the pipes $d$ $d'$, which steam or hot water, after being utilized, may escape through the pipe $d''$.

Connected with the hot-water vessels B C by the pipes $a''$ $c$ is the vessel D, which need not be jacketed; and connected with this vessel D is the vessel E, which may be the last of the series. The vessel E is jacketed like the vessels B C, which jacket, J, is intended to be supplied with cold water or other cooling agent by means of the pipe $k'$. The vessel E is also provided with pipe k, which may be attached to a filter, through which pipe the vessel is supplied with water. This vessel E is also provided with a door or other means of access, e, and an exhaust-pipe, a'''', which is connected with a suction-pump, F. Each of the tanks or vessels may be provided with cocks f and water-gages i, and are connected to each other by the pipes c, which are provided with stop-cocks. The vessels B C D E are arranged at different levels, so that the liquids contained therein may be drawn by means of the pipe c from the upper to the lower vessels as desired.

If preferred, the pump F may be located between the vessel B and the roaster A, and when so located it will draw the products from the roaster and force them through the different tanks, and will expel the gases which are not retained by the water.

If desirable, the tanks B C D E may all be placed on the same level, and by reversing the action of the pump the liquids may be forced from one tank into the others.

In practice this invention is preferably used as follows: The water in the first and second vessels is, previous to commencing the roasting, brought to the boiling-point. This is necessary, as water below this temperature would absorb and retain the volatile empyreumatic oils, which would spoil the product; besides, the caffeine is much more soluble in hot than in cold water. The third vessel may be filled with warm water and the fourth with cold water. By this means all the volatilized fat and empyreumatic oils will be collected in the fourth vessel. The amount of water in each vessel should be about two and a half to three gallons for each one hundred pounds of coffee roasted. The largest quantity of water should be placed in the first vessel, and the smallest quantity in the last vessel, as a portion of the water will pass by evaporation from the first to the other vessels, and be collected therein. The vessels being properly filled with water in the conditions above stated, and the jackets H and I being filled with hot water or steam, while the water in the vessel E is kept cool by the cold-water jacket J, the apparatus is now ready to receive the aroma or volatile substances from the coffee-roaster. The vapors which are evolved from the roaster are caused (by the aid of the pump) to pass through the series of vessels in succession, with the effect hereinbefore described. When the roasting is complete the liquid in the first vessel may be drawn off for use, (or it may be left in the vessel until two or more roastings are completed,) then by opening the cocks on the pipes c the contents of the vessel C may be drawn into B, D into C, and E into D, the contents of the vessel E, previous to being drawn into D, having been first skimmed to remove the empyreumatic oils and grease which are collected by the cold water, and which will float on the top of the liquid.

By my process I have succeeded in collecting a very large percentage of the matter usually lost while the coffee is being roasted. With the apparatus hereinbefore described, and with pure water in each of the vessels, after each roasting, or after sufficient coffee has been roasted to impregnate the liquid in the first vessel to the desired strength, the liquids in the succeeding vessels are changed from one to the other in regular order to secure a better result.

If desirable, the caffeic acid and the caffeotannic acid can be separated from the caffeine by a simple chemical process. As I now make use of the product the contents of the first vessel, after being saturated with the products of the roasted coffee which the hot water retains, are drawn off, filtered, and concentrated to the required strength. They may be then mixed with other ingredients (the basis being a mucilaginous substance) to form a coating for the roasted beans. This coating will thus contain all or nearly all of the valuable ingredients which have heretofore been lost, which coating will make the coffee stronger and more fragrant. It will also render it less liable to deteriorate by time.

This method of collecting and separating the products is simple and does away with the necessity of using chemicals, which is objectionable; and hence I wish it understood that I do not confine myself to the special apparatus herein described and shown for carrying out the process or method set forth.

What I claim as new, and desire to secure by Letters Patent, is—

1. The improvement in the art of collecting the volatile substances of the coffee-bean while being roasted, consisting in passing the said volatile substances through hot water for the purpose of impregnating said water with the products which are given off from the coffee, substantially as described.

2. The art or method hereinbefore described of collecting the volatile products of coffee which are given off while the coffee is being roasted, which consists in passing the volatile substances through hot water for the purpose of impregnating the hot water with caffeine, caffeic and caffeo-tannic acids, and through cold water for the purpose of collecting the empyreumatic oils.

3. The method of saving and utilizing the vapors which escape from coffee while being roasted, consisting, essentially, in causing the products to pass first through hot water, next through warm water, and lastly through cold water, for the purpose set forth.

4. In the art of utilizing the vapors or products which are given off from coffee while being roasted, the process of separating the empyreumatic oils, &c., and caffeine from each other by causing the vapors or products of the roasted coffee to pass through hot water, the hot water retaining the caffeine, and then collecting the empyreumatic oils, &c., by congealing them in cold water, substantially as described.

5. In combination with a coffee-roaster, receptacles, one or more containing hot water and another cold water, said receptacles and coffee-roaster being connected to each other by pipes, substantially as described.

6. In combination with a coffee-roaster, connecting means for conveying the aroma which is expelled from the coffee while being roasted into a vessel containing hot water, substantially as described.

7. In combination with a coffee-roaster, forcing means, one or more receptacles adapted to contain hot water, and connections, substantially as described, and for the purpose set forth.

8. A coffee-roaster provided with a pipe which enters a tight vessel and terminates near its bottom, which vessel contains hot water, and is connected near the top by a pipe which terminates near the bottom of another similar vessel, said vessel being provided with similar connections to other vessels containing warm and cold water, substantially as shown.

9. In combination with a coffee-roaster, a pipe for conveying the volatile substances from the roaster to a vessel containing hot water, said pipe terminating beneath the liquid and provided with a perforated disk, for the purpose set forth.

10. In combination with a coffee-roaster and connections, a tight vessel adapted to contain hot water, and provided with a jacket and means for keeping said water hot, substantially as shown.

11. In combination with a coffee-roaster, a vessel having a jacket for the reception of cold water, and connections, as shown, said vessel being provided with an opening or door, for the purpose set forth.

12. In combination with a coffee-roaster, two or more vessels provided with connections, substantially as shown, and a means for causing the volatile substances to pass through the different vessels, for the purpose set forth.

13. In combination with a coffee-roaster, two or more vessels connected with the roaster and with each other, as shown, said vessels being arranged one above the other and provided with connecting-pipe $c$, for the purpose set forth.

14. In combination with a coffee-roaster, the vessels B C D E, arranged at different levels with respect to each other, and provided with means for conveying the aroma from the roaster through the liquids in the different vessels, and means for conveying the liquids from the upper to the lower vessels, for the purpose set forth.

15. In an apparatus for collecting the volatile substances of coffee, a vessel, E, provided with water-inlet pipes $k\ k'$, cold-water jacket J, exhaust-pipe $a''''$, and door $e$, substantially as shown, and for the purpose set forth.

16. In an apparatus for collecting and separating the products which are given off from coffee while being roasted, the following organized instrumentalities: a coffee-roaster provided with a pipe, $a$, jacketed vessel B, adapted to contain hot water and to maintain it in a heated condition, and cock $f$, a similar jacketed hot-water vessel, C, a vessel, D, containing warm water and connected to a vessel, E, containing cold water, and provided with a cold-water jacket, J, exhaust-pipe $a''''$, pump F, and connecting and supply pipes, all arranged substantially as described, and for the purposes set forth.

RALPH S. JENNINGS.

Witnesses:
W. S. WILKINSON,
GEORGE E. SAVILLE.